United States Patent [19]

Wilfong

[11] Patent Number: 4,941,699
[45] Date of Patent: Jul. 17, 1990

[54] UNCASER FINGER

[75] Inventor: William G. Wilfong, Mogadore, Ohio

[73] Assignee: Figgie International, Inc., Richmond, Va.

[21] Appl. No.: 264,332

[22] Filed: Oct. 28, 1988

[51] Int. Cl.⁵ .............................................. B25B 1/04
[52] U.S. Cl. .................................. 294/99.1; 294/902; 294/87.22
[58] Field of Search ...................... 294/106, 902, 87.22, 294/87.1, 99.1

[56] References Cited

U.S. PATENT DOCUMENTS

| | | | |
|---|---|---|---|
| 972,340 | 10/1910 | Coogan | 294/99.1 X |
| 1,315,581 | 9/1919 | Scott | 294/99.1 X |
| 1,668,254 | 5/1928 | Scott | 294/99.1 X |
| 2,584,853 | 2/1952 | Elsey | 294/99.1 X |
| 2,670,985 | 3/1954 | King | 294/28 X |
| 2,739,008 | 3/1956 | Renner | 294/902 X |
| 2,800,356 | 7/1957 | Benton | 294/106 |
| 2,929,653 | 3/1960 | Hund et al. | 294/119.3 |
| 2,958,556 | 11/1960 | Samuelson et al. | 294/902 X |
| 3,007,734 | 11/1961 | Terry | 294/28 |
| 3,069,035 | 12/1962 | Schwarz et al. | 294/87.22 X |
| 3,096,960 | 7/1963 | Kinney | 294/99.1 X |
| 3,186,752 | 6/1965 | Kaplan et al. | 294/106 X |
| 3,370,879 | 2/1968 | Green et al. | 294/99.1 X |
| 3,415,034 | 12/1968 | Schmitt | 294/106 X |
| 3,531,836 | 10/1970 | Crickmer | 294/86.25 X |
| 3,576,057 | 4/1971 | Hoy | 294/106 X |
| 3,870,359 | 3/1975 | Hultquist | 294/106 X |
| 4,162,804 | 7/1979 | Davies | 294/106 X |
| 4,395,069 | 7/1983 | Lebret | 294/87.22 |
| 4,545,609 | 10/1985 | Pasquazzi et al. | 294/106 X |

FOREIGN PATENT DOCUMENTS

| | | | |
|---|---|---|---|
| 1121101 | 2/1966 | Fed. Rep. of Germany | 294/99.1 |
| 988722 | 8/1951 | France | 294/106 |
| 157777 | 12/1982 | German Democratic Rep. | 294/106 |

Primary Examiner—Margaret A. Focarino
Assistant Examiner—Joseph D. Pape
Attorney, Agent, or Firm—Renner, Kenner, Greive, Bobak, Taylor & Weber

[57] ABSTRACT

An uncaser finger for bottle handling apparatus. The finger includes a pair of opposed jaws operable for opening and closing upon the neck or rim of a bottle. Each of the jaws includes a plurality of parallel ridges or lips extending from the planar surfaces of the jaw and adapted for engaging the rims of the mouths of the bottles. A side flange is presented along each side of the jaws to prevent the bottles from escaping the grip of the jaw.

11 Claims, 2 Drawing Sheets

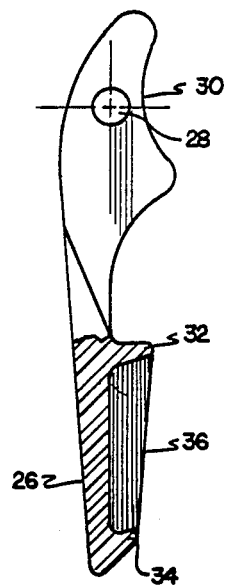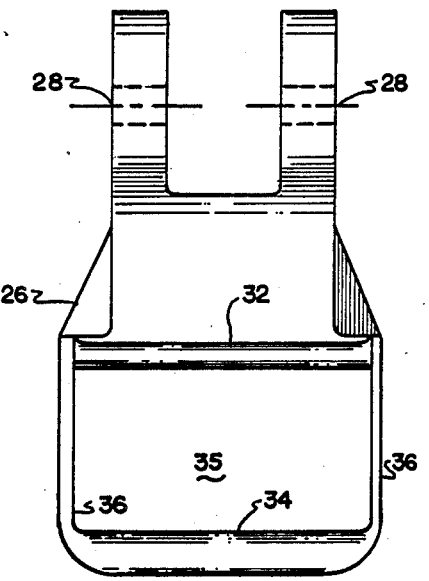
FIG. 2　　　　　FIG. 3
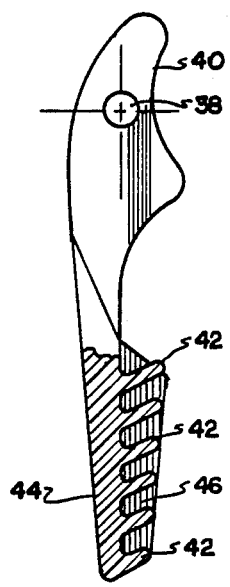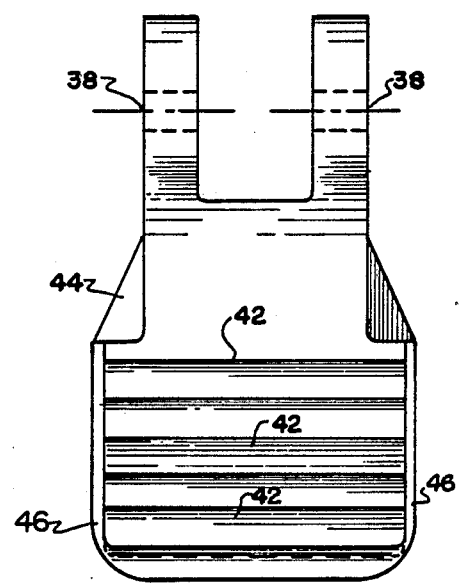
FIG. 4　　　　　FIG. 5

4,941,699

UNCASER FINGER

TECHNICAL FIELD

The invention herein resides in the art of article handling apparatus and, more particularly, to uncasers employed in the bottling industry. Specifically, the invention relates to a finger for an uncaser as used in bottle sorting apparatus.

BACKGROUND ART

It is well known in the bottling industry that empty bottles are often returned for cleaning and refilling. It is common for bottles of various sizes and configurations to be present in a single case when returned to the bottler. Such case is presented to a bottle sorting process in which an uncaser lifts the bottles from the cases and subsequently deposits them on a conveyor where they are passed to a sorter where like bottles are assembled together for cleaning and refilling. Uncasers typically used in bottle sorting apparatus generally include a plurality of bottle grippers or uncaser fingers. These fingers descend upon the bottles within the cartons and, when positioned over the mouth of the bottle, are caused to close to grip the bottle below the mouth at the mouth rim. The finger lifts the bottle from the case or carton and transports it to a conveyor which takes it to the sorting apparatus.

With prior art bottle grippers or uncaser fingers, a single gripping surface was provided for engaging the bottle rim. Accordingly, when released from an uncaser finger, a short bottle fell a longer distance to the conveyor than did a taller bottle. Indeed, the drop of the shortest bottle to be handled would typically be equal to the difference between its height and that of the tallest bottle to be handled. When bottles of significant height differences are to be handled by the prior art apparatus, it is not unusual for the shorter bottles to tip or fall when released by the finger at a substantial height above the conveyor. Such dropping and tipping reduces the effectiveness of the apparatus and prevents efficient operation of the same.

DISCLOSURE OF THE INVENTION

In light of the foregoing, it is a first aspect of the invention to provide an uncaser finger which accommodates bottles of various heights while maintaining the bottoms of the bottles in substantially the same elevation above the conveyor.

Another aspect of the invention is the provision of an uncaser finger having jaws with a plurality of gripping surfaces, the various gripping surfaces being adapted for securing bottles of various heights.

Another aspect of the invention is the provision of an uncaser finger which may be readily substituted for existing uncaser fingers known within the industry.

Still a further aspect of the invention is the provision of an uncaser finger which is easy to implement, durable and reliable in operation, and conducive to operation with state of the art apparatus.

The foregoing and other aspects of the invention which will become apparent as the detailed description proceeds are achieved by an uncaser finger, comprising: a housing; a pair of opposed jaws slidably received within said housing; and a plurality of gripping surfaces on each said jaw.

Other aspects of the invention which will become apparent herein are achieved by a bottle gripper for uncasers, comprising: a housing; and a pair of opposed jaws received by said housing for reciprocating movement therein, said jaws having a pair of planar opposed surfaces, said surfaces of said jaws having thereon a plurality of parallel ridges traversing said respective surfaces, the ridges of each said jaw being in opposed alignment with corresponding ridges of the other jaw of said pair.

DESCRIPTION OF DRAWINGS

For a complete understanding of the objects, techniques and structure of the invention, reference should be had to the following detailed description and accompanying drawings wherein:

FIG. 2 is a partial sectional view of a jaw taken from the finger assembly of FIG. 1;

FIG. 3 is a front plan view of the jaw assembly of the uncaser finger of FIG. 1;

FIG. 4 is a partial sectional view of a jaw of a second embodiment of an uncaser finger according to the invention; and FIG. 5 is a front plan view of the jaw of FIG. 4.

BEST MODE FOR CARRYING OUT THE INVENTION

Figure 1:
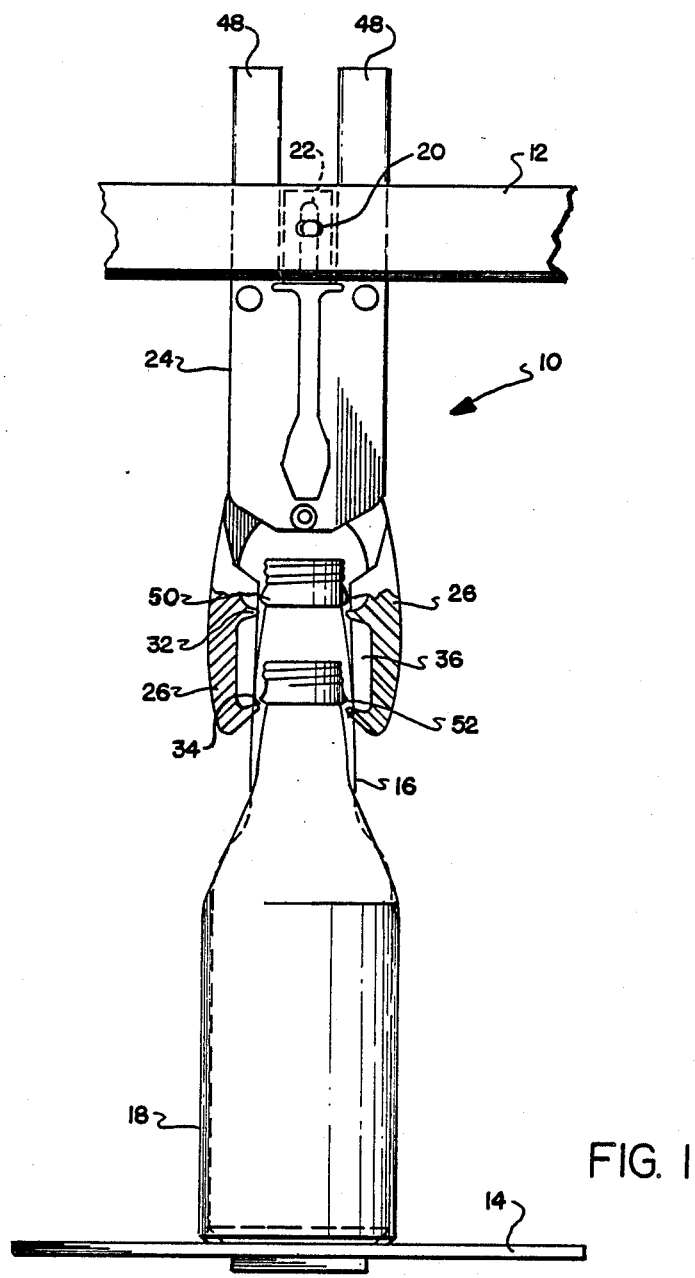
FIG. 1 is a front plan view of an uncaser finger according to the invention showing the same in illustrative engagement with bottles of different heights.

Referring now to the drawings, and more particularly FIG. 1, it can be seen that an uncaser finger or bottle gripper is designated generally by the numeral 10, the same being shown in employment in an uncaser apparatus. The finger 10 is carried by a finger bar 12 which is positioned above an appropriate conveyor 14, all well known in the art. For purposes of illustration, the finger 10 is shown illustratively as being in engagement with a taller bottle 16 and a substantially shorter bottle 18, the same being positioned for receipt by the conveyor 14.

As is well known in the art, a pin 20 is received within a guide slot 22 within the finger bar 12 and in engagement with a spring-biased rod (not shown) received within the housing 24. Pivotally connected to the rod is a pair of jaws 26 operative for opening and closing action by means of an appropriate cam and cam follower arrangement within the housing 10. As best shown in FIGS. 2 and 3, taken in conjunction with FIG. 1, the jaws 26 have openings or bores 28 passing therethrough for receiving a pin for interconnection with the spring-biased rod. A cam surface 30 is provided on each of the pair of jaws 26 for engagement with a fixed cam surface within the housing 24 such that relative movement between the rod and the housing 24 will cause the jaws 26 to pivot about the pins which are received within their respective bores 28 to open or close with respect to the bottles 16, 18 received thereby.

As shown in FIGS. 1-3, the jaws 26 each include and upper ridge or lip 32 protruding from a substantially planar surface 35 of the jaw 26. Formed at the bottom of the surface 35 and in parallel arrangement with the upper lip or ridge 32 is a lower lip or ridge 34. A side flange or guard 36 extends along the lateral sides of the planar surface 34, being normal to both the lips 32, 34 and the planar surface 35.

A second embodiment of the jaws which might be employed in the uncaser finger 10 is shown in FIGS. 4 and 5. Here, a jaw 44 is provided with bores or openings 38 for receiving a pin therethrough for engagement with a spring-biased rod. Again, the jaws 44 are provided with a cam surface 40 for mating engagement with a cam which is formed as part and parcel of the housing 24. Lips or ridges 42 extend laterally along the flat planar surface of each of the pair of jaws. Here, it can be seen that more than just a simple pair of such ridges or lips 42 are provided, but that a number of such lips are provided in spaced parallel relationship to each other. It will also be appreciated that the lips or ridges 42 are angled upwardly or are oblique to the jaw surface. Again, a side flange or guard 46 is provided normal to the ends of each of the ridges 42 and normal to the flat planar surface of the jaw 44 from which the ridges 42 extend. In a preferred embodiment, the flanges 46 extend from the planar surface of the jaw in an amount at least equivalent to the extension of the ridges or lips therefrom.

In operation, a cam is caused to engage the prongs or extensions 48 of the housing 24, urging the housing 24 downwardly, compressing the spring of the spring-biased rod and urging the cam surfaces 30 against the corresponding cam surfaces on the interpart of the housing 24. This cam engagement causes the jaws 26 to open and release the bottles 16, 18. It will be appreciated that the bottoms of the bottles 16, 18 are at substantially the same height above the conveyor 14, even though the bottles are of different heights. This is because the upper lip 32 engages beneath the rim 50 of the taller bottle 16, while the lower lip 34 engages beneath the rim 52 of the shorter bottle 18. With the spacing of the lips 50, 52 being substantially equivalent to the differences in heights between the tallest and shortest bottles expected in the processing line, the bottoms of the bottles can be kept in very close relationship to each other for their release above the conveyor 14. Accordingly, the drop of the bottle is minimized, greatly reducing the likelihood of tipping, falling, or breaking.

It will also be appreciated that the flanges 36, 46 are provided at the ends of the lips and planar surfaces of the respective jaws to prevent the bottles from rolling out of the jaw grip. In other words, by extending the flanges 36, 46 inwardly at least to the extent that the lips extend inwardly, it is assured that the rims 50, 52 will engage such flanges should the bottles move to either end of the jaw assembly.

It will be appreciated by those skilled in the art that the jaw of FIGS. 4 and 5, having six lips, as shown, will accommodate a greater variation in bottle sizes while maintaining the levels of the bottoms of the bottles then will the finger of the assembly of FIGS. 1-3, having only two lips. Of course, it is within the concept of the invention to provide a jaw having any number of lips or ridges protruding therefrom. It will also be appreciated by those skilled in the art that the lips or ridges 32, 42 may be either rigid or of a flexible or pliable material such as rubber or plastic, depending upon the size, surface texture, weight, and the like of the bottles being handled.

Finally, it should be readily appreciated by those skilled in the art that the bottoms of the bottles, while residing within the cases from which they are extracted by the uncaser fingers, all lie within the same plane. Accordingly, the disparity in elevation of the bottoms of the bottles when lifted by the uncaser fingers should simply be a function of the resolution of the uncaser fingers as determined by the number and spacing of the ridges or lips traversing the flat planar surface of the jaws.

Thus it can be seen that the objects of the invention have been satisfied by the structure presented herein above. While in accordance with the Patent Statutes, only the best mode and preferred embodiment of the invention has been presented and described in detail, it is to be understood that the invention is not limited thereto or thereby. Accordingly, for an appreciation of the true scope and breadth of the invention, reference should be had to the following claims.

What is claimed is:

1. An uncaser finger, comprising:
   a housing;
   a pair of opposed jaws, slidably received within said housing;
   a plurality of gripping surfaces on each said jaw;
   said gripping surfaces of one of said jaws being in opposed alignment with said gripping surfaces on the other of said jaws of said pair, said gripping surfaces comprising a pair of parallel lips extending laterally across a substantially flat surface on said jaws; and
   a pair of flanges extending along each side of said substantially flat surface at opposite ends of said lips.

2. The uncaser finger according to claim 1 wherein said gripping surfaces comprise in excess of a pair of parallel lips extending across said substantially flat surface.

3. The uncaser finger according to claim 1 wherein said flanges extend from said substantially flat surface substantially the same extent that said lips extend from said surface.

4. The uncaser finger according to claim 1 wherein said lips are normal to said substantially flat surface.

5. The uncaser finger according to claim 1 wherein said lips are oblique to said substantially flat surface.

6. The uncaser finger according to claim 1 wherein said lips are rigid.

7. The uncaser finger according to claim 1 wherein said lips are flexible.

8. A bottle gripper for uncasers, comprising:
   a housing;
   a pair of opposed jaws received by said housing for reciprocating movement therein, said jaws having a pair of planar opposed surfaces, said surfaces of said jaws having thereon a plurality of parallel ridges traversing said respective surfaces, the ridges of each jaw being in opposed alignment with corresponding ridges of the other jaw of said pair; and
   side flanges extending along opposite sides of each of said planar surfaces, said side flanges being normal to said parallel ridges.

9. The bottle gripper according to claim 8, wherein said flanges extend from said planar surfaces a distance substantially equal to an extension from said planar surfaces by said ridges.

10. The bottle gripper according to claim 8, wherein said ridges are flexible.

11. The bottle gripper according to claim 8, wherein said ridges are rigid.

* * * * *